(12) United States Patent
Barreneche et al.

(10) Patent No.: US 11,851,539 B2
(45) Date of Patent: Dec. 26, 2023

(54) LAMINATION FILM AND ADHESIVE THEREFOR

(71) Applicants: DOW GLOBAL TECHNOLOGIES LLC; DOW QUIMICA DE COLOMBIA S.A.; ROHM AND HAAS COMPANY

(72) Inventors: Felipe Martinez Barreneche, Houston, TX (US); Elkin David Cardona Jimenez, Medellin, CO (US); Juan Carlos Casarrubias, Mexico City (MX); Jie Wu, Lake Jackson, TX (US)

(73) Assignees: Dow Global Technologies LLC, Midland, MI (US); Dow Quimica de Colombia SA, Bogota (CO); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 17/311,319

(22) PCT Filed: Oct. 25, 2019

(86) PCT No.: PCT/US2019/058094
§ 371 (c)(1),
(2) Date: Jun. 4, 2021

(87) PCT Pub. No.: WO2020/117399
PCT Pub. Date: Jun. 11, 2020

(65) Prior Publication Data
US 2022/0017706 A1 Jan. 20, 2022

Related U.S. Application Data

(60) Provisional application No. 62/774,989, filed on Dec. 4, 2018.

(51) Int. Cl.
*C08J 5/12* (2006.01)
*B32B 1/00* (2006.01)
(Continued)

(52) U.S. Cl.
CPC ............. *C08J 5/124* (2013.01); *B32B 1/00* (2013.01); *B32B 7/12* (2013.01); *B32B 27/08* (2013.01);
(Continued)

(58) Field of Classification Search
CPC . C08J 5/124; C08J 5/18; C08J 2323/26; C08J 2367/02; B32B 1/00; B32B 7/12;
(Continued)

(56) References Cited

U.S. PATENT DOCUMENTS

| 4,873,307 A | 10/1989 | Federici et al. |
| 4,889,915 A | 12/1989 | Brauer et al. |

(Continued)

FOREIGN PATENT DOCUMENTS

| WO | WO2014036106 | * 3/2014 | ............ B32B 15/08 |
| WO | WO2017119469 | * 7/2017 | ............ C08L 23/08 |
| WO | 2018013222 A1 | 1/2018 | |

OTHER PUBLICATIONS

PCT/US2019/058094, International Search Report and Written Opinion dated Jan. 31, 2020.

(Continued)

*Primary Examiner* — Michael C Miggins

(57) ABSTRACT

A film structure including: (a) at least one functionalized film layer, wherein the at least one film layer comprises a polar-reactive group polyolefin layer used as an internal layer in the film structure; and (b) a lamination adhesive composition present on, and in contact with, a least a portion of a surface of the internal layer; wherein the green tack value of the adhesive composition is greater than 0.772

(Continued)

Newtons/centimeter; a laminate including the above film structure bonded to a substrate layer; a process for producing the film structure; a process for producing the laminate; and a laminated article made from the above laminate.

7 Claims, 3 Drawing Sheets

(51) Int. Cl.
| | |
|---|---|
| B32B 7/12 | (2006.01) |
| B32B 27/08 | (2006.01) |
| B32B 27/16 | (2006.01) |
| B32B 27/30 | (2006.01) |
| B32B 27/32 | (2006.01) |
| B32B 27/36 | (2006.01) |
| B32B 37/12 | (2006.01) |
| B65D 65/40 | (2006.01) |
| C08J 5/18 | (2006.01) |

(52) U.S. Cl.
CPC ............ *B32B 27/16* (2013.01); *B32B 27/306* (2013.01); *B32B 27/32* (2013.01); *B32B 27/36* (2013.01); *B32B 37/12* (2013.01); *B65D 65/40* (2013.01); *C08J 5/18* (2013.01); *B32B 2307/714* (2013.01); *B32B 2439/46* (2013.01); *C08J 2323/26* (2013.01); *C08J 2367/02* (2013.01)

(58) Field of Classification Search
CPC ....... B32B 27/08; B32B 27/16; B32B 27/306; B32B 27/32; B32B 27/36; B32B 37/12; B32B 2307/714; B32B 2439/46
See application file for complete search history.

(56) References Cited

U.S. PATENT DOCUMENTS

| | | |
|---|---|---|
| 5,843,057 A | 12/1998 | McCormack |
| 6,358,357 B1 | 3/2002 | Lamber et al. |
| 10,272,650 B2 | 4/2019 | Gargalaka et al. |
| 2015/0183193 A1 | 7/2015 | Chen et al. |
| 2019/0001636 A1 | 1/2019 | Kupsch et al. |

OTHER PUBLICATIONS

PCT/US2019/058094, International Preliminary Report on Patentability dated Jun. 17, 2021.

* cited by examiner

LAMINATION FILM AND ADHESIVE THEREFOR

FIELD

The present invention relates to a laminate film and an adhesive composition used in a lamination process for producing the final laminate structure.

BACKGROUND

The flexible packaging industry continues to search for ways of increasing the bond strength of adhesives used to produce laminates for manufacturing packaging products such that the integrity of the final packaging product is maintained for the use life of the package and the product packaged in the packaging product made from a laminate such as a pouch or a bag. In addition to the bond strength of the adhesive, it is very important that the final packaging product maintains its integrity when the product being packaged is a chemically aggressive product which can attack the adhesive leading to degradation of the bond strength and the eventual deleterious effect on the soundness of the packaging system.

Some of the known adhesives used heretofore as lamination adhesives such as "general-purpose adhesive systems", have a low chemical resistance, i.e., the adhesive does not have a sufficient chemical resistance value to withstand an attack of the adhesive's bond strength accompanied by a failure mode of the laminate structure using the adhesive. A low chemical resistance property is generally an undesirable characteristic for adhesives systems used for packaging chemically aggressive products. Using adhesives having a low chemical resistance in a lamination process for packaging chemically aggressive products can lead to serious processing problems and packaged products failure. For example, a laminated film using such adhesives can fall apart during the packaging process and can potentially cause loss of product, damage to the equipment, and delays in the overall package manufacturing process. Therefore, it would be a huge benefit to the industry to provide an adhesive that has a high chemical resistance property.

However, for some packaged products/goods that are not chemically aggressive, such as dry cereal and other dried goods, a general-purpose adhesive with a low chemical resistance functions well for packaging such goods without the integrity of the adhesive or the package being compromised. The general-purpose adhesive provides the manufacturer a low cost alternative to high performance adhesives that can be quite costly. Thus, the use of a lower chemical resistance adhesive lowers the cost of consumer goods with benefits the consumer.

What would be desirous to the industry is a general-purpose adhesive with a high chemical resistance that functions well for packaging chemically aggressive goods without the integrity of the adhesive or the package being compromised. Thus, the low-cost alternative general-purpose adhesive could be used in a wider scope of applications.

SUMMARY

The present invention can solve the problem of the integrity of an adhesive being attacked by a chemically aggressive product which is in contact with the adhesive during the packaging process of such product in a package article made using the adhesive of the present invention.

The present invention provides a novel combination of (a) a proper monolayer or multilayer film structure and (b) a proper polymeric lamination adhesive composition of different functionalized polymers; wherein the adhesive has a sufficiently high chemical resistance value to survive degradation of the adhesive's bond strength and to provide integrity to the laminate structure using such adhesive (e.g., without a failure mode such that the laminate structure functions and remains functional for its intended use). The use of the above combination of components (a) and (b) in a lamination process, can minimize or eliminate the problem of the integrity of the adhesive being attacked by a chemically aggressive product during the packaging process of such product in the package article. Advantageously, the use of the above combination of (a) a film structure and (b) a lamination adhesive composition in a lamination process provides a laminate film structure for producing a packaging film/package article. This, in turn, enhances the reliability of the overall process for packaging goods using the laminate film of the present invention.

In accordance with the present invention, one embodiment is directed to a combination structure of a film and an adhesive including: (a) at least one functionalized film layer comprising a polar-reactive group polyolefin layer used as an internal lamination layer in the film structure; and (b) a lamination adhesive composition present on, and in contact with, a least a portion of a surface of the internal layer; wherein the chemical resistance value of the adhesive composition to the functionalized internal surface of the lamination film is increased, in terms of bond strength, from the adhesive's original chemical resistance value; and the laminate structure using such adhesive does not undergo a failure mode.

In another embodiment, the present invention is directed to a process for producing the above film/adhesive structure.

In still another embodiment, the present invention relates to a laminate including: (a) at least one functionalized film layer comprising a polar-reactive group polyolefin layer used as an internal lamination layer in the film structure; (b) a lamination adhesive composition present on, and in contact with, at least a portion of a surface of the internal layer; wherein the chemical resistance value of the adhesive composition is sufficiently high to be useful in a laminate structure in contact with a chemically aggressive product; and (c) at least one polar or non-polar substrate; wherein at least a portion of a surface of the substrate is in contact with the adhesive composition.

In yet another embodiment, the present invention is directed to a process for producing the above laminate.

In even still another embodiment, the present invention is directed to a packaging article made using an adhesive having a strong bond and a high chemical resistance value.

DETAILED DESCRIPTION

Figure 1:
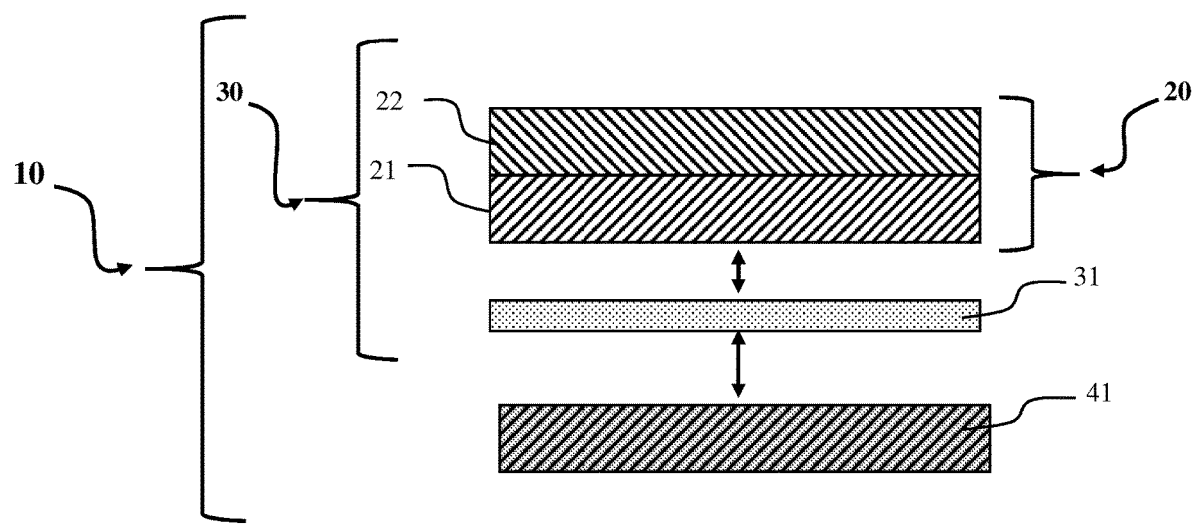
FIG. 1 is a schematic diagram showing a multilayer film structure of the present invention.

A "medium performance adhesive", a "general performance adhesive", or "general purpose adhesive" are used herein interchangeably and, herein refers to a mono-component polyurethane adhesive or a polyurethane adhesive having two or more components that, once the adhesive is fully cured and properly applied between two substrate films, the adhesive will lose adherence in the two substrate films structure if the adhesive between the two films is subjected to high thermal stress conditions such as heat sealing (e.g., between 180° C. and 220° C.) and/or a sterilization process; and/or while the adhesive is in contact with different aggressive chemical stuffs (e.g., acids, spicy, surfactants, essences, alcohol, peroxide).

"Chemical resistance", with reference to an adhesive composition, herein refers to the capability of an adhesive to resist different aggressive chemical stuffs (e.g., acids, spicy, surfactants, essences, alcohol, peroxide) so as not to lose adherence in a two substrate films structure when the adhesive applied between the two substrate films is subjected to one or more of the aggressive chemical stuffs (also referred to herein as "chemical attack agents"). A chemical resistance value for an adhesive can be provided by measuring the bond strength of the adhesive used in a laminate after the laminate is exposed to a chemical attack agent; and the benefit or the damage on bond strength can be measured in terms of an applied adhesion force after a bond strength test and the failure mode of the laminate structure after the bond strength test. In another embodiment, the adhesive bond strength of the laminate structure can be compared to the adhesive bond strength of a reference or control sample laminate also exposed to the same chemical attack agent.

While the chemical resistance value of an adhesive can depend on various factors, for example, (1) the control sample laminate structure, (2) the composition of the films bonded together with the adhesive, and (3) the type of chemical attack agent used to test the laminates, an increase (or decrease) of the adhesive bond strength compared to the control sample laminate is a good indication of chemical resistance. However, to make a more reliable determination of chemical resistance, the bond strength value of an adhesive should be accompanied by a description of the failure mode of the laminate structure.

The failure mode can include, for example, tunneling, delamination, bubbling, or tearing, as determined by visual observation after testing the laminate for chemical resistance. The chemical resistance test used herein seeks to understand the failure mode of the laminate bonded with adhesive after subjecting the laminate bonded with adhesive to an aggressive chemical test (e.g., putting alcohol into a pouch of a 10 cm×10 cm size, wherein the pouch is made from the laminate). After 48 hours, the bond strength of the laminate structure is measured and the failure mode of the laminate structure is visually observed. In one preferred embodiment, the failure mode shows tear, instead of delamination, or no failure at all; and the adhesion force applied to the laminate (in an attempt to delaminate the laminate structure) can be greater than or equal to 200 g-f/in. A laminate structure that passes the above aggressive chemical test, i.e. a laminate structure that has an acceptable chemical resistance property, is a laminate structure that exhibits a bond strength, as measured by the applied adhesion force, of at least 200 g-f/in after a bond strength test and the failure mode of the laminate structure after the bond strength test is either a tear or no failure mode.

In general, the laminate of the present invention includes at least two films and at least one lamination adhesive in between the two films to form the laminate. The adhesion force of greater than or equal to 200 g-f/in described above is measured when the laminate is subjected to a delamination test, that is, the adhesion force is obtained by trying to delaminate one film from the other film with the adhesive in the middle of the films opposing delamination. The first film is the film of the present invention disclosed herein; and the other second film can be a conventional substrate such as PET, BOPP, metPET, metBOPP, BOPA and the like as disclosed herein. Thus, in a preferred embodiment, the aforementioned 200 g-f/in adhesion force is the bond strength measured in the delamination test and applied between the first and second film layers; that is, the bond strength should be sufficient for the laminate to withstand a measured adhesion force of at least 200 g-f/in when the laminate is subjected to a delamination test in an attempt to delaminate the first film layer from the second film layer with the adhesive composition disposed between the layers opposing delamination.

"Green tack" or "green bond", with reference to an adhesive composition, herein means an initial bond strength value generated by the adhesive just after a structure containing the adhesive (e.g., a film/adhesive/film structure) passes through the NIP section of a laminating machine (the NIP is the small contact between two cylinders: one cylinder made of steel and the other cylinder made of rubber). In general, a higher molecular weight of the adhesive leads to a higher viscosity which, in turn, leads to a higher green bond.

"Bond strength", with reference to an adhesive composition, herein means the force that opposes delamination of a film laminated structure. The bond strength can be related to the adhesive composition. In a two-component adhesive, for example, selection of a correct stoichiometry of the adhesive composition can be important. For example, an adhesive that is rich in polyester will adhere stronger to polar films such as aluminum foil, metallized film, polyethylene terephthalate, polyamide, and the like. And, for example, an adhesive that is rich in polyether polyol will adhere stronger to non-polar substrates such as polyethylene, polypropylene, and the like.

By "predominantly isocyanate groups" or "predominantly hydroxyl groups", with reference to an adhesive composition, herein means the active or functional group present in an adhesive system. For example, isocyanate groups are the functional groups/reactive groups present in Part A of a two-component polyurethane adhesive; and Part B of the two-component polyurethane adhesive contains predominantly hydroxyl groups that will react with the isocyanate groups (of Part A) to form the adhesive. The chemical reaction starts after blending Part A and Part B together.

"Functionalized", with reference to a polymer resin, herein means when a functional (polar) group is chemically incorporated into another polar or non-polar polymer chain (e.g., polyethylene or ethylene-polar copolymer) providing "additional chemical polar functionality".

One broad embodiment of the present invention includes a film structure of: (a) at least one functionalized film layer comprising a polar-reactive group (i.e., a functionalized polymer compound) polyolefin layer used as an internal lamination layer in the film structure; and (b) a lamination adhesive composition present on, and in contact with, a least a portion of a surface of the internal layer; wherein the chemical resistance value of the adhesive composition after the adhesive is subjected to a chemical resistance is greater than the chemical resistance value of the adhesive composition before the adhesive is subjected to a chemical resistance test.

The film structure produced to be combined with a lamination adhesive composition can include a monolayer or a multilayer film structure. The multilayer lamination film structure is not limited to any particular number of layers; accordingly, in one preferred embodiment, the number of layers of the film structure can include from 1 layer to 13 layers made, for example, using a coextrusion process. For example, the film structure can include one or more layers of low density polyethylene (LDPE), linear low density polyethylene (LLDPE), or a blend of LDPE/LLDPE in any layer of the film structure provided that at least the internal lamination layer of the film structure comprises the polar-reactive group (functionalized) polyolefin layer, component (a), of the present invention.

The lamination adhesive composition, component (b), used in combination with the film structure, component (a), may include (1) a mono-component adhesive; or (2) an admixture of: ($\alpha$) at least one isocyanate component; and ($\beta$) at least one polyol component. The isocyanate component ($\alpha$) of the lamination adhesive formulation or composition of the present invention includes at least one isocyanate compound; and the isocyanate is the predominant compound present in the adhesive composition, i.e., the concentration of the isocyanate component ($\alpha$) is greater than the concentration of the polyol component ($\beta$).

For example, a mono-component adhesive (e.g., ADCOTE 331) useful in the present invention contains predominant content of isocyanate groups. Therefore, in accordance with the present invention, the concentration of the isocyanate compound, component ($\alpha$), used in the formulation of the present invention can be generally, for example, from 0.5 wt % to 10 wt % in one embodiment, from 1 wt % to 5 wt % in another embodiment; and from 2 wt % to 3 wt % in still another embodiment; based on the total weight of all components in the formulation.

Examples of adhesives that contain a predominantly isocyanate content and that are useful in the present invention include a general-purpose mono-component adhesive such as Adcote 331; and mixtures of the general purpose mono-component adhesive and other optional adhesives. Such adhesive advantageously has a strong chemical resistance.

The adhesive formulation of the present invention has advantageous properties and benefits. For example, in one embodiment, the adhesive of the present invention has an increase in chemical resistance compared to other adhesive formulations that do not contain an isocyanate component that is the predominant component in the adhesive composition.

One embodiment of the adhesive composition of the present invention includes a general purpose adhesive composition having a chemical resistance sufficient to provide protection against chemically aggressive products in contact with the adhesive and laminates using the adhesive. For example, the adhesive composition may include commercial embodiments such as Adcote 331 (a general purpose adhesive comprising a mono-component). The chemical resistance of the adhesive is influenced by the type of film layer having the adhesive applied thereon. For example, a polar-reactive group (functionalized) polyolefin layer used as an internal layer in the film structure, component (a), described above can determine if the final adhesive bond, the laminate and the article made from the laminate, will have a sufficient chemical resistance to avoid chemical attack by a product contacting the adhesive, laminate or article. In one embodiment, the polymer resin formulation, that is used to make up the internal layer of the film structure, beneficially has a high content of functionalization which can be beneficial for enhancing the chemical resistance property. For example, the maleic anhydride content present in a polyethylene (PE) formulation which can be used as the internal layer of the film structure of the present invention can be in the range of from 0.15 wt % to 1.5 wt % in one embodiment, from 0.5 wt % to 1.4 wt % in another embodiment, and from 0.8 wt % to 1.2 wt % in still another embodiment, based on the weight of the total blend. Other functionalized ethylene copolymers that can be combined with maleic anhydride useful in the present invention can include, for example ethylene copolymers such as ethylene vinyl acetate (EVA), ethylene ethyl acrylate (EEA), ethylene acrylic acid (EAA), ethylene methyl acrylate (EMA), and the like; and mixtures thereof.

A general-purpose mono-component adhesive (e.g., ADCOTE 331 adhesive) having a chemical resistance to a chemically aggressive product can provide integrity to laminates made using the adhesive which may be in contact with the laminate and adhesive. In turn, a packaging article made from the laminate can maintain its integrity while in contact with the chemically aggressive product. While packaging for snacks or powder do not always necessarily require chemical resistance, in applications that do require a sufficient chemical resistance property the formulation of the present invention can be advantageously used because the adhesive formulation of the present invention exhibits unexpected high chemical resistance property. The present invention adhesive composition provides a product having an increased chemical resistance property; and thus, providing a laminate product that can be used in many applications where previously such laminate product could not be used.

In general, the chemical resistance value (as defined herein above) of the adhesive composition of the present invention can be provided in terms of an adhesion force applied to the laminate structure in an attempt to delaminate the laminate structure after the laminate is subjected to a chemical resistance test and a delamination test. The chemical resistance value of the adhesive composition of the present invention can be, for example, a bond strength (e.g., as measured by adhesion force) of at least greater than 200 g-f/in in one embodiment, greater than 300 g-f/in in another embodiment, greater than 400 g-f/in in still another embodiment, and greater than 500 g-f/in in yet another embodiment. In another embodiment, the chemical resistance value of the adhesive composition can be, for example, a bond strength (e.g., as measured by adhesion force) of less than 2,000 g-f/in, less than 1,000 g-f/in in still another embodiment, and less than 900 g-f/in in still another embodiment. In a general embodiment, the adhesion force can be from greater than or equal to 200 g-f/in up to 2,000 g-f/in.

The adhesion force increase (or decrease) to determine bond strength should be accompanied by a fail mode, if any. As aforementioned, "failure mode" can include, for example, tunneling, delamination, bubbling, or tearing, as determined by visual observation after testing the laminate. The failure mode observed of a laminate structure made with the adhesive of the present invention can be tearing with no other visual failure mode; or no failure mode at all such that the adhesive and laminate can be acceptable in the present invention. Any other laminae failure mode observed (e.g., tunneling, delamination, bubbling and the like) along with the measured bond strength of the adhesive does not meet the acceptable chemical resistance in the present invention.

Another embodiment of the adhesive composition of the present invention includes a lamination adhesive composition that has a high green tack adhesion value of, for example, greater than (>) 0.772 Newtons/centimeter (N/cm) or 200 grams-force/inch (g-f/in); >1,158 N/cm (300 g-f/in) in another embodiment; and >1.544 N/cm (400 g-f/in) in still another embodiment. In even still another embodiment, the green tack adhesion value of the adhesive composition can be in the range of, for example, from >0.772 N/cm (200 g-f/in) to 1.93 N/cm (500 g-f/in).

One benefit of the innovative design of the lamination film layer in contact with the adhesive composition of the present invention is that the adhesive composition has (1) a rapid development of green tack and (2) a faster bond strength development; based on the chemical interaction between the lamination layer and the adhesive layer after the lamination process. For example, when a predominantly isocyanate product is used to form an adhesive composition, the green bond (i.e., the green tack value) of the adhesive increases unexpectedly faster for the adhesive containing the predominantly isocyanate product than for an adhesive product without a functionalized resin. For example, an adhesive composition that has a higher content of functionalization, such as a MAH grafted copolymer (e.g., AMPLIFY™ EA 101-g-MAH), can have a higher green bond.

Another benefit of the present invention is the design of a lamination film with an OH functionality in the lamination layer promotes better instant adhesion and eliminate lag times of hours or days usually required to allow adhesion buildup after curing of the adhesive. By providing better instant adhesion and eliminating lag times, a significant reduction in the overall conversion process time can be achieved. Presently, laminators have to wait between 12 hours (hr) and 24 hr before the laminators can conduct a subsequent conversion step (e.g., a slitting step or a second lamination step) after application of the lamination adhesive. The long wait times of between 12 hr and 24 hr can be due, in particular, to the low green tack of the low-medium molecular weight (MW) adhesives used in the lamination process.

Still another benefit from using the films produced according to the present invention (with functionalized lamination surface layer) is that of capturing residual unreacted isocyanate pre-polymers that can be present in solventless lamination adhesives. For example, when poor blend ratios of isocyanate pre-polymers and polyols are prepared, unreacted isocyanate pre-polymers in the solventless adhesives which are low molecular weight components can easily form and migrate to the film heat seal layer and form polyurea when the unreacted isocyanate pre-polymers come in contact with external moisture. This polyurea formation on the heat seal layer of laminates does not easily melt; and the polyurea formation can be the cause of anti-seal problems primarily in solventless laminations.

In general, the process for producing the combination film/adhesive structure of the present invention includes the steps of:
(i) providing (a) at least one film layer comprising a polar-reactive group (functionalized) polyolefin layer used as an internal layer in the film structure;
(ii) providing (b) a lamination adhesive composition having a sufficient chemical resistance value; and
(iii) applying the lamination adhesive composition to a least a portion of a surface of the internal layer to form a combination of an internal layer and lamination adhesive composition film structure.

The process of making the film structure can include any of the layer making equipment and process known to those skilled in the art such as a coextrusion process and equipment.

In general, the laminate can include: (a) at least one film layer comprising a polar-reactive group (functionalized) polyolefin layer used as an internal layer in the film structure; (b) a lamination adhesive composition present on, and in contact with, at least a portion of a surface of the internal layer; wherein the chemical resistance value of the adhesive composition is a bond strength of at least 200 g-f/in or greater; and (c) at least one polar or non-polar substrate; wherein at least a portion of a surface of the substrate is in contact with the adhesive composition.

With reference to FIG. 1, there is shown a plurality of layers forming a laminate, generally indicated by numeral 10. As aforementioned, the film structure, generally indicated as numeral 20 can be a monolayer, for example, the film structure comprising solely layer 21 which can serve both as an internal layer and an external layer. In the embodiment shown in FIG. 1, the film structure 20 includes an internal layer 21 adhered to a separate and different external layer 22. Although not shown in FIG. 1, another embodiment of the present invention can include any multiple number of layers sandwiched inbetween the internal layer 21 and the external layer 22. As shown in FIG. 1, the adhesive layer 31 is applied to the internal surface of layer 21; and a substrate 41 is contacted with the adhesive layer 31 to adhere the substrate to the film structure 20 via the adhesive 31 and internal layer 21. The layers 20, 31 and 41 can be compressed and laminated together to form the multilayer laminate 10.

The combination film/adhesive structure of the present invention has been described above. Once the adhesive is applied to the film layer, a substrate, component (c) can be contacted with the film/adhesive structure via the adhesive side.

The substrate useful in the present invention to produce the laminate can be, for example, at least one polar or non-polar substrate. Exemplary of polar substrates useful for contacting the film/adhesive combination described above can include polyethylene terephthalate (PET), bi-oriented poly amide (BOPA), metalized polyethylene terephthalate (metPET), metalized bi-oriented polypropylene (metBOPP), and aluminum foil. Exemplary of non-polar substrates useful for contacting the film/adhesive combination above can be polypropylene (PP), polyethylene (PE), and bi-oriented polypropylene (BOPP), and cast polypropylene (cPP) films.

The process for producing the laminate described above can include the steps of:
(I) providing (a) at least one film layer comprising a polar-reactive group (functionalized) polyolefin layer used as an internal layer in the film structure;
(II) providing (b) a lamination adhesive composition having a sufficient chemical resistance value;
(III) providing at least one polar or non-polar substrate;
(IV) applying the lamination adhesive composition to a least a portion of a surface of the internal layer to form a combination of an internal layer and lamination adhesive composition film structure; and
(V) contacting the at least one polar or non-polar substrate with the adhesive composition present on the internal layer; wherein at least a portion of a surface of the substrate is in contact with the adhesive composition to effectuate a strong bond between the substrate adhered to the internal layer to form a laminate.

The process of making the laminate can include any of the laminate making equipment and process known to those skilled in the art such as dry lamination where the bonding agent is dissolved in a solvent; then the bonding agent-containing solvent is applied to one of the webs to be laminated; and then the solvent is evaporated from the web having the bonding agent-containing solvent applied on the web's surface. The evaporation can take place in a drying oven to provide a first dried web. The first dried web is then laminated to another second web under strong pressure applied by heated rollers to provide a permanent bond between the two webs.

The laminate produced in accordance with the present invention advantageously has several advantageous properties and benefits. In one embodiment, for example, the laminate can be used in applications where chemically aggressive products will be in contact with the laminate or the adhesive used to make the laminate; and the adhesive can have a sufficient chemical resistance against attack by the chemically aggressive products as described above. In another embodiment, the laminate can be used immediately to make an article, such as a packaging article, without having to wait for a long curing time of the adhesive because of the high green tack exhibited by the adhesive-to-film combination.

In another embodiment, the present invention is directed to a packaging article made using the laminate described above which has been manufactured using an adhesive having a strong bond and a chemical resistance value of a bond strength of at least 200 g-f/in or greater and a failure mode of tearing. Exemplary of packaging articles may include pillow pouches, stand-up pouches, bags, sachets, other laminate webs, and the like.

The process of making the packaging article can include any of the packaging making equipment and processes known to those skilled in the art such as Vertical Form/Fill/Seal (VFSS), Horizontal Form/Fill/Seal (HFFS), premade Stand-up Pouches (SUP), and Form/Fill/Seal Stand-up Pouches (FFS SUP) machines.

The film structure and laminate made in accordance with the present invention can be useful in a variety of applications including, for example, paper/poly/foil or BOPP/foil/PE, or BOPP/metPP/PE, BOPP, or cPP.

EXAMPLES

The following examples are presented to further illustrate the present invention in detail but are not to be construed as limiting the scope of the claims. Unless otherwise stated all parts and percentages are by weight.

Various raw materials used in the Examples are described in Table I as follows:

TABLE I

| Raw Materials | | |
|---|---|---|
| Component | Brief Description | Supplier |
| Elite 5400 | Metalocene LLDPE copolymer | The Dow Chemical Company (Dow) |
| Amplify EA 101-g-MAH | Ethylene ethyl acrylate copolymer grafted with maleic anhydride | Method A* |
| EVA ELVAX | Ethylene vinyl acetate | Dow-DuPont |
| Amplify TY 1057 | MAH grafted polyethylene | Dow |
| ADCOTE 331 | Mono-component general purpose lamination adhesive | Dow |

Notes for Table I:
*"Method A" is a method used to make Amplify EA 101-g-MAH and is described herein below. "EA" stands for "ethyl acrylate"; "MAH" stands for "maleic anhydride"; "g-MAH" stands for "grafted with maleic anhydride"; "EVA" stands for "ethylene vinyl acetate"; and LLDPE" stands for "linear low density polyethylene".

Examples 1 and 2, and Comparative Example A

Three different films, having the resin formulations described in Table II, were extruded using a five-layer coextrusion line. The films were laminated to a polyethylene terephthalate (PET) substrate (12 microns thick) using a laboratory laminating machine (Labo Combi machine); and one of the side surfaces of the films were corona treated prior to applying 3 g of adhesive to the corona treated surface of the film. Then, 3 g of a general purpose mono-component adhesive, ADCOTE™ 331, was applied to the corona treated surface of the film.

TABLE II

| Formulations of Lamination Resins | |
|---|---|
| Example | Formulation |
| Comp. Ex. A | 100% Elite 5400 (reference resin) |
| Inv. Ex. 1 | 35% EVA ELVAX + 65% AMPLIFY ™ TY 1057 |
| Inv. Ex. 2 | 35% AMPLIFY ™ EA 101-g-MAH % + 65% AMPLIFY ™ TY 1057 |

Method A—Method of Making AMPLIFY™ EA 101-g-MAH

Amplify EA is an ethylene ethyl acrylate (EEA) copolymer. This copolymer can be grafted with about 1% maleic anhydride (MAH) groups to enhance the copolymer's functionality. Copolymers such as EEA, EVA or EMA copolymers have polarity and tend to form polar-polar (non-reactive) interactions with the adhesive layer. However, the MAH-g-group portion of a MAH grafted copolymer will tend to form a covalent bond with any excess polyol in the adhesive.

The product description of AMPLIFY™ EA 101-g-MAH is described in Table III; and the process of preparing AMPLIFY™ EA 101-g-MAH can be carried out by grafting a polymer with maleic anhydride (MAH) groups using a reactive extrusion process. A 92 mm co-rotating twin screw extruder, with medium intensity screws, is used for the reactive extrusion. The formulation consists of a base polymer (e.g., AMPLIFY™ EA 101, maleic anhydride (MAH), 99%) and 2,5-dimethyl-2,5-di(t-butylperoxy) hexane (DBPH, peroxide (POX)). The POX is diluted with mineral oil (e.g., at a 1:1 ratio) to enhance ease of handling and feeding the feed material. The MAH feed level is between 1.4 wt % to 1.5 wt % and the peroxide feed level is at 330 ppm to 650 ppm. The extruder is operated at a rate of 862 kg/hr to 953 kg/hr with a screw speed of between 475 rpm to 630 rpm. The temperature profile (in ° C.) of the extruder for grafting is shown in Table IV.

TABLE III

Product Descriptions

| Product | Brief Description of Product | Density (g/cm$^3$) | Melt Index (° C./min$^{(2)}$) | Maleic Anhydride (wt %$^{(3)}$) | Acrylate (wt %) |
|---|---|---|---|---|---|
| AMPLIFY ™ EA 101 | Ethylene ethyl acrylate copolymer | 0.931 | 6 | 0 | 18.5 |
| AMPLIFY ™ EA 101-g-MAH$^{(1)}$ | Maleic anhydride concentrate | 0.931 | 3.23 | >0.5 wt % and <2.5 wt % | 18.5 |

Notes for Table III:
$^{(1)}$Maleic anhydride grafted AMPLIFY ™ EA 101.
$^{(2)}$At 2.16 kg and 190° C.
$^{(3)}$Based on total product weight

TABLE IV

Temperature Profile of Extruder

| ZONE 2 | ZONE 3 | ZONE 4 | ZONE 5 | ZONE 6 | ZONE 7 | ZONE 8 | ZONE 9 | ZONE 10 | ZONE 11 | S/C$^{(1)}$ | PDV$^{(2)}$ | DIE |
|---|---|---|---|---|---|---|---|---|---|---|---|---|
| 177 | 191 | 191 | 191 | 191 | 191 | 177 | 121 | 121 | 121 | 177 | 177 | 177 |

Notes for Table IV:
$^{(1)}$"S/C" stands for screen changer; and
$^{(2)}$"PDV" stands for polymer divert valve.

Chemical Resistance Test Method and Measurement

Different tests or methods exist to assess the chemical resistance performance of an adhesive material. A common test used herein, includes filling, with ethanol, a 10*10 cm laminated pouch which has been constructed from laminated films made using the formulations of lamination resins described above. Each pouch filled with ethanol used in this test is stored in an oven at 80° C. for a period of 3 days. The heating of the pouches is used to accelerate the chemical attack of the laminated film by the ethanol. After processing the pouches using the above aggressive test, the laminate of the pouch is subjected to bond strength analysis to determine the adhesive bond strength.

Green Tack Bond Strength—Method and Measurement

The green tack bond property of an adhesive can be measured by using an Instron Tensile machine, according to procedure described in ASTM F904-98. In accordance with the procedure, two sides of a laminated structure are held by the machine jaws and then the laminated structure is stretched in a uniaxial direction. Data is obtained by taking two-sample measurements of each sample; and the data is then analyzed using a computer that reports averages and graphics. The green tack property is measured 10 minutes after the laminated structure has gone through the lamination process.

The chemical resistance test used in the Examples seeks to understand the failure mode of the laminates after the laminates are subjected to an aggressive chemical test (i.e., enclosing alcohol in a pouch of 10 cm×10 cm size). After 48 hours (hr), the bond strength of the laminates is measured and a failure of the structure is visually determined to be a tear instead a delamination and the forces for obtaining a tear is greater than 500 Win.

Figure 2:
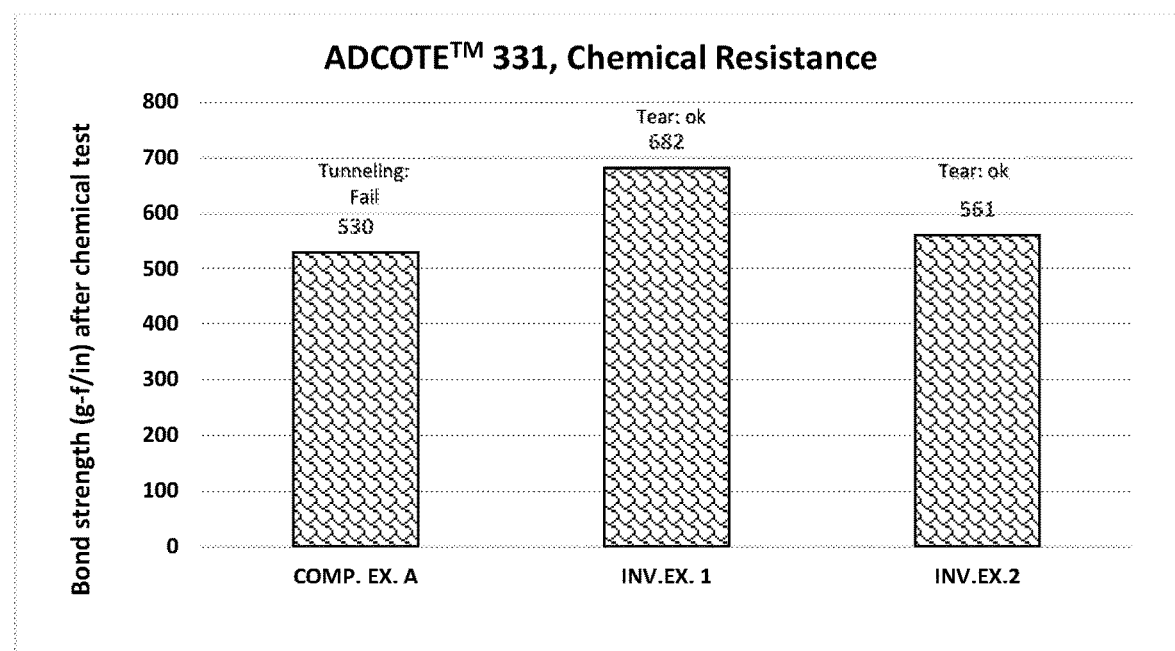
FIG. 2 is a graphical bar chart showing the chemical resistance values of a general-purpose lamination adhesive, ADCOTE™ 331, with various different polyethylene formulations.

In the graph of FIG. 2, there is shown the results of chemical attack when structures are laminated with ADCOTE™ 331. The formulations of Inv. Ex. 1 and Inv. Ex. 2 withstood the aggressive test (no delamination or tunneling was observed during the tests) while the reference formulation of Comp. Ex. A did not pass the failure mode test.

Figure 3:
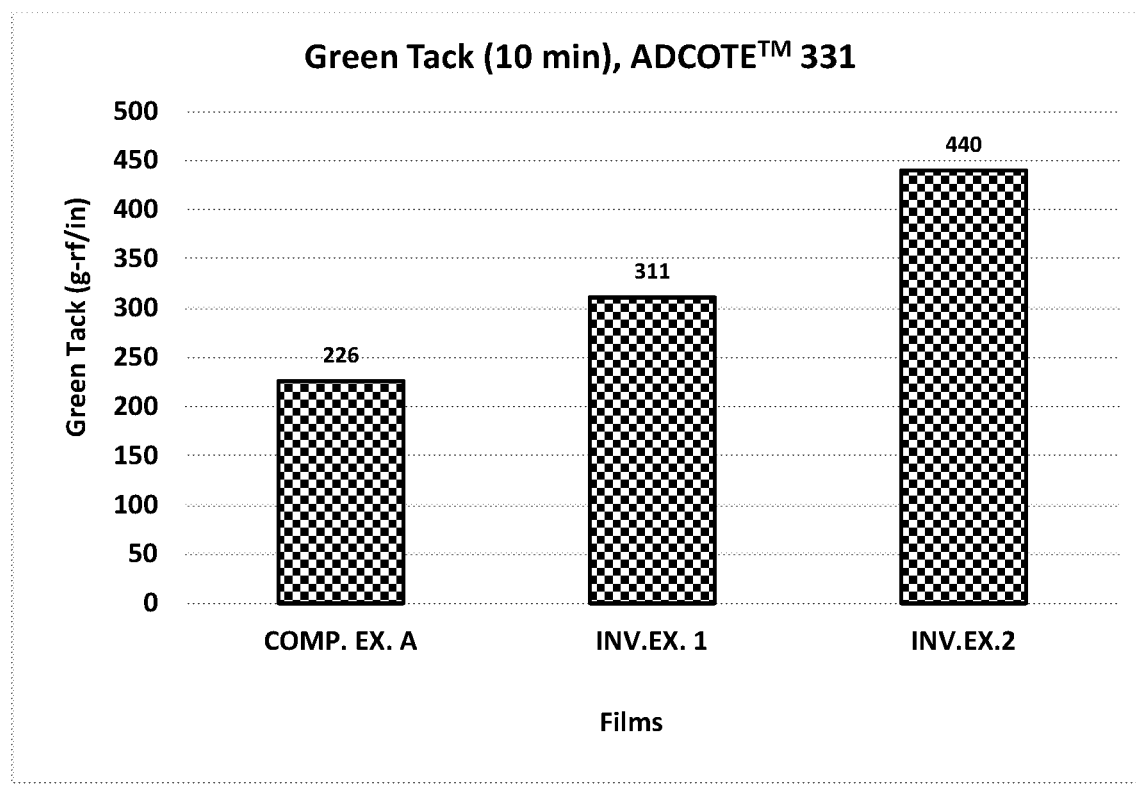
FIG. 3 is another graphical bar chart showing the green tack values of a general-purpose lamination adhesive, ADCOTE 331, with various different polyethylene formulations.

In the graph of FIG. 3, there is shown green tack values when a mono-component and general-purpose adhesive, ADCOTE™ 331 is used. The formulations of Inv. Ex. 1 and Inv. Ex. 2, respectively, show unexpected higher values of green tack (+37% and +94.7%, respectively) of initial bonds when compared to the reference of Comp. Ex. A.

The results of the above tests described in FIG. 2 and FIG. 3, demonstrates that an internal film layer such a blend of Amplify TY 1057 (MAH) and an EVA polymer in combination with the general-purpose adhesive, ADCOTE™ 331, (Inv. Ex. 1) shows an increase in the chemical resistance and green bond of laminates compared to the Comp. Ex. A. Similar behavior is observed for a film layer such as Amplify TY 1057 (MAH) combined with co-polymer of ethyl acrylate, AMPLIFY EA 101 (MAH), with the same general-purpose adhesive (Inv. Ex. 2).

What is claimed is:

1. A film structure comprising:
    (a) at least one functionalized film layer, wherein the at least one functionalized film layer comprises a polar-reactive group polyolefin layer used as an internal lamination layer in the film structure; wherein the polar-reactive group polyolefin layer consists of a physical blend of an ethylene vinyl acetate polar copolymer and a grafted ethylene polar copolymer; and wherein the polar-reactive group has a functional group that comprises 0.15 wt. % to 1.5 wt % based on the total weight of the polyolefin layer; and
    (b) a lamination adhesive composition present on, and in contact with, a least a portion of a surface of the internal layer;
    wherein the chemical resistance value of the lamination adhesive composition is a bond strength sufficient for the laminate to withstand a measured adhesion force of at least 200 g-f/in when the laminate is subjected to a delamination test accompanied by a failure mode of tearing or no failure mode.

2. The film structure of claim 1, wherein the at least one functionalized film layer is a monolayer.

3. The film structure of claim 1, wherein the at least one functionalized film layer comprises a multilayer of two or more layers, wherein at least one of the two or more layers is an internal layer of a polar-reactive group polyolefin layer, and at least one of the two or more layers is an external layer.

4. The film structure of claim 1, wherein the lamination adhesive composition is a general-purpose mono-component adhesive having predominantly isocyanate groups.

5. The film structure of claim 1, wherein the polar-reactive group polyolefin layer consists of a physical blend of 35% of the ethylene vinyl acetate polar copolymer, based on the total weight of the polyolefin layer, and 65% of the grafted ethylene polar copolymer, based on the total weight of the polyolefin layer.

6. A process for producing a film structure comprising the steps of:
  (i) providing at least one functionalized film layer, wherein the at least one functionalized film layer is a polar-reactive group polyolefin layer used as an internal layer in the film structure; wherein the polar-reactive group polyolefin layer consists of a physical blend of an ethylene vinyl acetate polar copolymer and a grafted ethylene polar copolymer; wherein the polar-reactive group has a functional group that comprises 0.15 wt. % to 1.5 wt. % based on the total weight of the polyolefin layer;
  (ii) providing a lamination adhesive composition having a sufficient chemical resistance value, wherein the chemical resistance value of the lamination adhesive composition is a bond strength sufficient for the laminate to withstand a measured adhesion force of at least 200 g-f/in when the laminate is subjected to a delamination test accompanied by a failure mode of tearing or no failure mode; and
  (iii) applying the lamination adhesive composition to a least a portion of a surface of the internal layer to form a combination film structure of the internal layer and the lamination adhesive composition.

7. The process of claim 6, wherein the polar-reactive group polyolefin layer consists of a physical blend of 35% of the ethylene vinyl acetate polar copolymer, based on the total weight of the polyolefin layer, and 65% of the grafted ethylene polar copolymer, based on the total weight of the polyolefin layer.

* * * * *